Jan. 12, 1932.   C. S. BRAGG ET AL   1,840,882
POWER ACTUATOR

Original Filed Aug. 4, 1927   2 Sheets-Sheet 1

INVENTORS
Caleb S. Bragg
Victor W. Kliesrath
BY
Louis Prevost
ATTORNEY

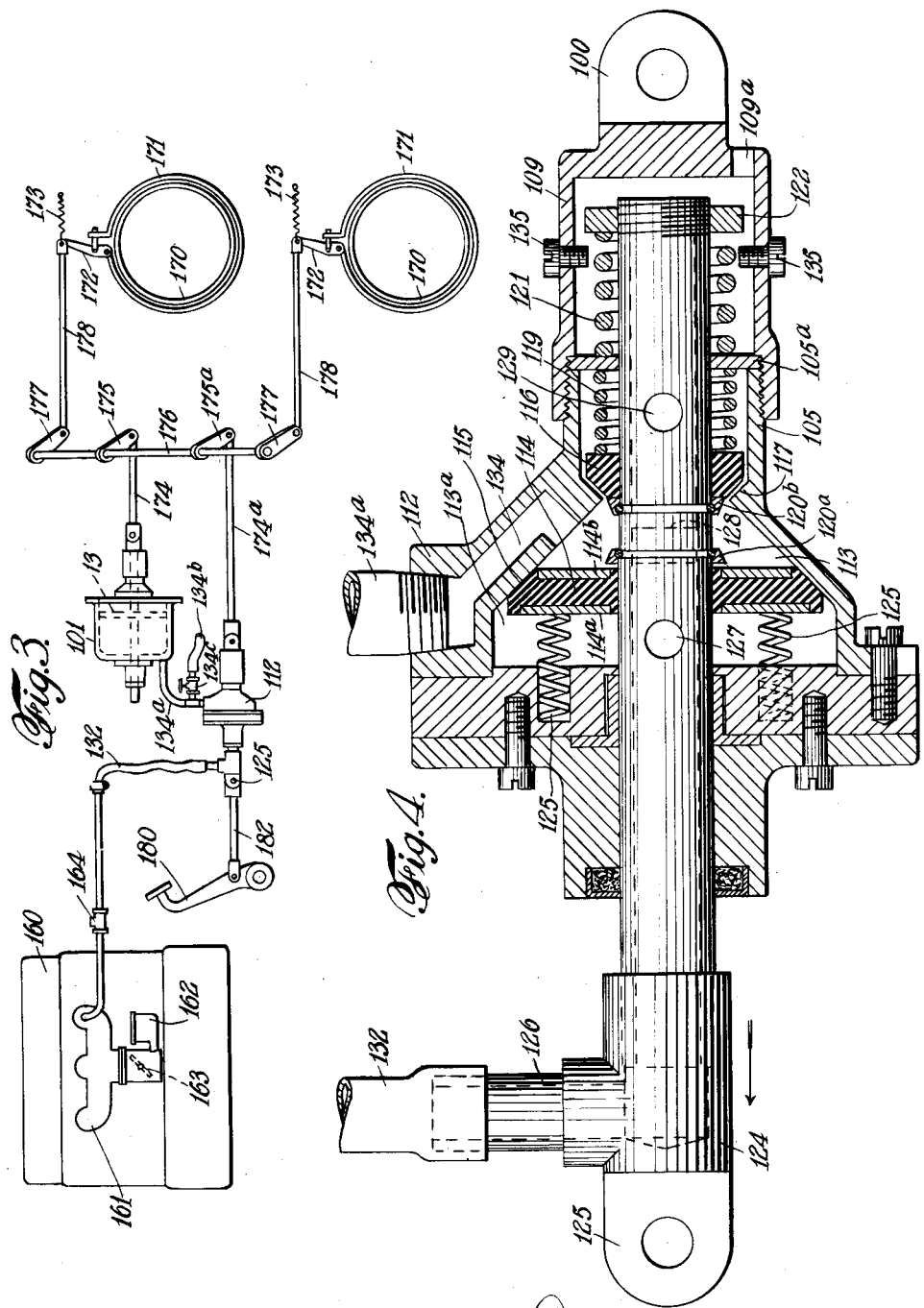

Patented Jan. 12, 1932

1,840,882

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed August 4, 1927, Serial No. 210,512. Renewed May 20, 1931.

Our invention consists in the novel features hereinafter described, reference being had to the accompanying drawings which shows one embodiment of the invention selected by us for purposes of illustration, and the said invention is fully disclosed in the following description and claims.

Our invention relates to valve mechanism for controlling one or more power actuators as are used in connection with automotive vehicles and especially for the operation of the brake mechanism thereof, in which the piston of the actuator, or the piston of each actuator, if the valve mechanism is arranged to control a plurality of actuators, is normally submerged in the higher pressure fluid, when in retracted position. The higher pressure fluid may be air at atmospheric pressure operating against suction obtained from a suitable source, as the suction passage of the internal combustion engine which propels the vehicle, or the higher pressure fluid may have a greater pressure than atmospheric and operated against atmospheric pressure, as the lower pressure, or against suction, as preferred. Our improved valve mechanism is connected with an operator operated part and constructed so as to enable the operator to determine the degree of pressure which the piston of the actuator is exerting on the brakes or other part to be operated, by the increased resistance which the operator operated part offers to the operator, as for example, by the increased pressure against his foot where a pedal lever for actuating the valve mechanism is employed.

In carrying out our present invention the low pressure or suction valve is normally subjected to the higher fluid pressure on one face and to the lower fluid pressure on the other face, the said valve being provided with yielding resistance means, tending to seat it and to substantially counterbalance the higher fluid pressure on the valve and holding it seated against the suction of the motor, where the suction passage of the engine is relied upon as the source of lower pressure, the said yielding resistance means being interposed between the valve and a part connected with the part to be operated, and preferably between the valve and a part of the piston or valve casing therein, when the valve mechanism is located in the piston of an actuator, means being provided for maintaining the suction or lower pressure valve closed and the higher pressure valve open, to expose the piston to the higher fluid pressure (as atmospheric pressure, for example) on both faces when the valve mechanism is in the released position. The construction is such that when the operator operated part is moved in a direction to open the lower pressure valve, or suction valve, and close the higher pressure valve, or atmospheric valve, and exhaust the air from the portion of the cylinder with which the valve is connected, it will only require sufficient force on the part of the operator to overcome a predetermined initial pressure, to wit, the excess of the pressure of said resistance means acting on the lower pressure face of the lower pressure valve, above the higher fluid pressure acting on the opposite face, but as soon as the lower pressure valve is opened, the fluid pressures on the opposite faces of the valve will become partially or wholly equalized, thereby transferring the previously substantially counterbalanced pressure of the resistance means to the operator through the valve, and the operator operated part, in proportion to the reduction of the differential of fluid pressures on opposite faces of the valve, and at the same time operating the piston of the actuator (or the pistons of the actuators), controlled by the valve mechanism to an extent determined by the movement of the operator operated part. The operator will thus be enabled to gauge the amount of power the power actuator, or actuators, is, or are, exerting by the increasing resistance of the operator operated part. The movement of the operator operated part is also in the same direction as the movement of the piston to effect its operative stroke, and there is, therefore, no loss of power in operating the valve mechanism, as the power of the operator when applied in opposition to said resistance means will be transmitted to the piston, or the part to be operated thereby, in a direction to assist its operative stroke.

Where the operator operated part is connected with the brake mechanism, or other part to be operated by means providing lost motion, to permit the physical force of the operator to be applied to the brakes in addition to that of the actuator, or in case of failure of power, there is no loss of power, as the physical force exerted by the operator to overcome the reaction of the resistance means will be transmitted therethrough to the brakes, or other part to be actuated, and whereby the valve mechanism is located in the piston will be transmitted to the piston to assist in moving it in the direction of its effective stroke. Our invention thus permits the use of a cylinder and piston of smaller diameter than is possible where the reactionary feature is obtained by linkages which transmit a portion of the power exerted by the piston to the operator operated part, and we are, therefore, enabled to reduced the cost and weight of the actuator. Furthermore, where the actuator is operated by suction obtained from the suction passage of an internal combustion engine, the reduction in the size of the actuator cylinder, or cylinders, results in smaller quantities of air being admitted into the suction passage of the engine at each application of the brakes, and the danger of stalling the engine if idling, or interfering with its operation, is greatly reduced. It is also to be noted that if after the lower pressure valve has been opened to apply the brakes to a desired extent, the operator permits said valve to close against its stop, or seat, the load of the resistance means will be transferred from the operator operated part to the valve seat, or stop, and the brakes may be held as applied while descending long grades, for example, without physical effort or fatigue.

Our invention also contemplates the provision of a higher pressure valve of much smaller diameter than the lower pressure valve, and having the areas of its opposite faces as small as possible in connection with a retracting spring for opening said valve. The opposite faces of the higher pressure valve are subjected to the maximum differential of fluid pressures, in a direction to seat the valve, when the suction or lower pressure valve is fully opened, and the air inlet or higher pressure valve is closed, and by making the areas of the opposite faces of the higher pressure valve as small as possible, a very light retracting spring may be employed, to effect the release movement of the operator operated part and valve mechanism. This spring is also preferably located between the valve actuating means and a part connected with the piston (or the part to be actuated thereby), so that the force required to compress this retracting spring is also transmitted to the piston in the direction of its effective stroke.

Referring to the accompanying drawings,

Fig. 3 is a diagram similar to Fig. 1 showing the valve mechanism exterior to the cylinder, in the linkage between the operator operated part and the brake mechanism.

Fig. 4 represents an enlarged sectional view of the valve mechanism shown in Fig. 3.

Figure 1:
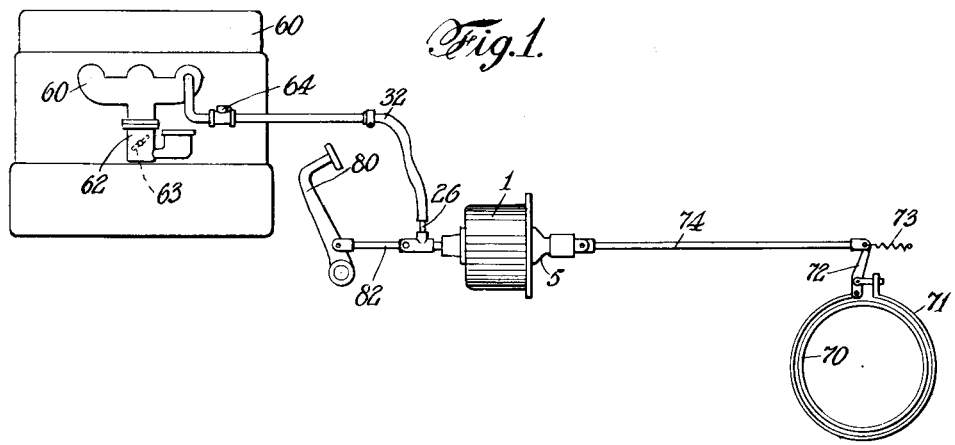
Fig. 1 is a diagrammatic view illustrating an installation in an automotive vehicle of an actuator embodying our invention, deriving its suction from the intake manifold of the engine, and arranged to apply the brake mechanism of the vehicle.
Figure 2:
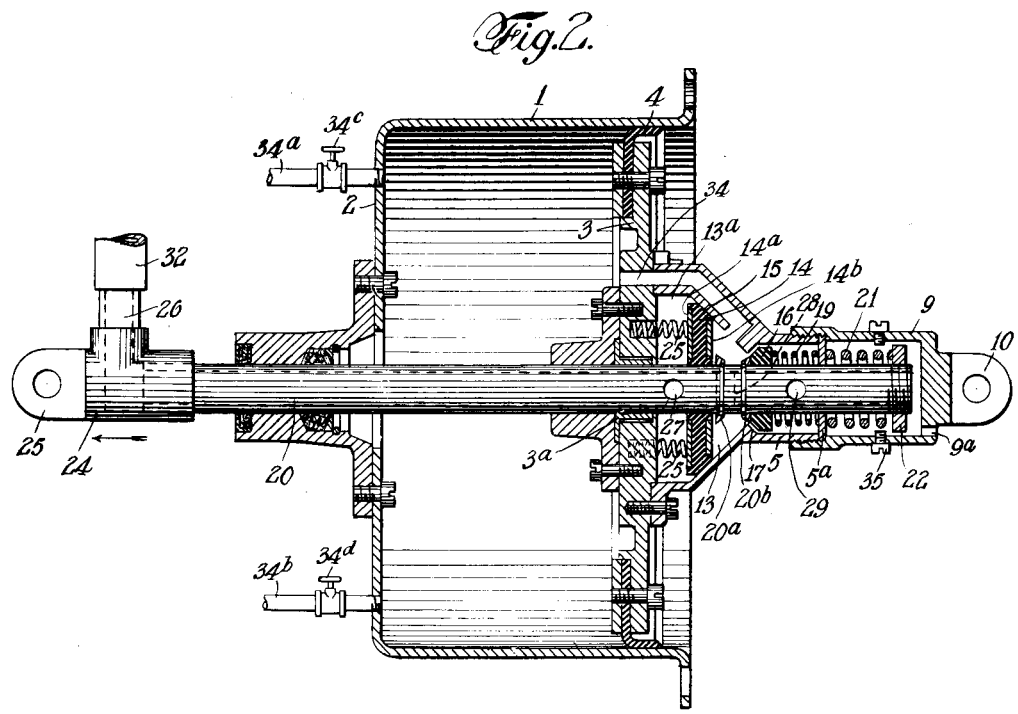
Fig. 2 is an enlarged sectional view of the actuator embodying our invention.

In Figs. 1 and 2 of the accompanying drawings, we have shown an embodiment of the invention in which the controlling valve mechanism is located in the piston of a power actuator and constructed to normally maintain the piston subjected to atmospheric pressure, as the higher fluid pressure, on its opposite faces when in its retracted position, so that the piston is in this instance submerged in air at atmospheric pressure, the lower fluid pressure being obtained in this instance by a suction pipe connected with the suction passage of the internal combustion engine. It is to be understood, however, that the invention is equally applicable to installations in which the valve mechanism is located outside of the actuator cylinder and operatively connected therewith, as for example where the valve actuating part and the valve casing are located in linkage between the operator operated part and the brake mechanism, or other part to be operated, in a manner similar to that illustrated in our application for Letters Patent of the United States, filed March 13, 1926, and given Serial No. 94,412.

In the embodiment illustrated in these figures of drawings, 1 represents the actuator cylinder closed at one end by a head, 2, and open at the other end to the atmosphere, and provided with a piston, 3, having the usual gasket, 4. The piston is shown provided with a hollow piston rod, 5, at the outer end of which is a cap, 9, provided with a perforated ear, 10, for connecting the piston to the brake mechanism or other part to be actuated.

The controlling valve mechanism for the actuator is shown as being located in the piston itself, and comprises a valve chamber indicated at 13, provided within the same with a suction valve, 14, of relatively large diameter, adapted to engage a valve seat, or stop, 15, the valve chamber being provided with a portion on the forward face of the suction valve which communicates at all times with the source of suction as hereinafter described, and may be termed a suction chamber, $13^a$. The suction valve, 14, may be formed of molded cork, or rubber, suitably reinforced as by metallic plates, or rings, 14ª, 14ᵇ, or the valve may be formed of any other suitable material, or materials, if desired. The valve has a central aperture engaging with a sealing fit a valve actuating sleeve, 20, extending through a stuffing box in the head, 2, of the cylinder, through a stuffing box, 3ª, in the piston and through the valve chamber, and preferably through the hollow piston rod, 5, into cap, 9, as shown, the sleeve being capable of longitudinal movement through the valve. The sleeve, 20, is provided in rear of the suction valve, 14, with a collar, 20ª, for engaging the valve, 14, when the valve sleeve is moved in the direction of the arrow in Fig. 2, to open the valve. The suction valve, 14, is provided with yielding resistance means, in this instance a series of springs, 25, which may be arranged in a circular series, and conveniently engaged with the rear or lower pressure face of the valve, in a direction to hold it seated, the springs being interposed between the suction valve and a part rigidly connected with the valve casing, in this instance a part of the piston. As hereinafter described, the rear face of the suction valve is normally exposed to the higher fluid pressure, in this instance atmospheric pressure, the forward face being subjected to suction, and the springs, 25, are calibrated so as to more than equal the differential of fluid pressure on the opposite faces of the valve, which faces are of considerable area. It will also be seen that the movement of the suction valve, 14, to unseat it and compress the springs, 25, will be in the same direction as the power stroke of the piston.

The tubular piston rod 5 has an inwardly extending annular flange providing a valve seat, or stop, 17, adapted to be engaged by the higher pressure valve, in this instance an air inlet valve, 16, which is preferably made of considerably smaller diameter than the suction valve, 14, and provided with a spring, 19, tending to seat it, said spring being interposed between the valve and an inwardly extending collar, 5ª, connected with the hollow piston rod, and in this instance clamped between the end of the piston rod and the cap, 9. The valve, 16, may also be made of molded cork, or rubber, or other suitable material, and is provided with a central aperture engaging the sleeve, 20, with a sealing fit, and permitting the movement of the sleeve through the valve. The valve actuating sleeve, 20, is also provided with a collar, 20ᵇ, for engaging the forward side of the air inlet valve in a direction to open it. The valve actuating sleeve is provided with a retracting spring, 21, interposed between a collar, 22, on the rear end of the sleeve, and the collar, 5ª, to normally maintain the parts in the position shown in Fig. 2. The collars, 20ª and 20ᵇ, are so located that a movement of the valve actuating sleeve in either direction will open one valve and permit the other to close, and so that both valves may be permitted to close simultaneously when desired. The sleeve, 20, is also provided at its forward end with a fitting, 24, having an ear, 25, for attaching it to the operator operated part, and a tubular connection, 26, communicating with the interior of the sleeve and adapted to be connected with a suction pipe, 32, leading to the intake manifold of the engine, (or other source of suction). The valve actuating sleeve, 20, is also provided with suction apertures, 27, at all times in communication with the suction chamber, 13ª, and is also provided with a plug, or partition, 28, in rear of the apertures, 27, separating the rear end of the sleeve from the suction pipe. The cap, 9, is provided with an aperture, 9ª, for the admission of the higher pressure fluid, in this instance atmospheric air, and this aperture communicates with the interior of the sleeve, 20, at its rear end, and the sleeve is also provided with inlet apertures, 29, communicating with the hollow piston rod in rear of the air inlet valve, 16, for supplying atmospheric air, or other pressure fluid, to the valve chamber, when the valve, 16, is opened. The valve chamber is also provided with a passage, indicated at 34, extending through the piston and establishing communication between the valve chamber and the cylinder forward of the piston.

It will be understood that the lower pressure valve will have its opposite faces of the requisite area, in accordance with the pressure of the higher pressure fluid, which, as before stated, may be atmospheric, or above atmospheric, and the yielding resistance means will be so calibrated that the higher pressure fluid nearly counterbalances the same. The resistance means will also supply the desired maximum resistance when the fluid pressures on opposite faces of the valve are equalized.

As the higher pressure valve is exposed to the maximum differential of fluid pressures when closed and the lower pressure valve is open, and is thereby held closed, and as this higher pressure valve is opened by the action of the retracting spring 21, we prefer to make the higher pressure valve of as small diameter as possible to reduce the areas of its opposite faces, so as to avoid the necessity of a very strong retracting spring for the valve actuating sleeve, which would otherwise be necessary to open this valve and release the brake mechanism. We employ a very light spring, 21, in comparison with the resistance spring, or springs, of the lower pressure valve, so that this retracting spring does not add materially to the initial pressure required to open the lower pressure valve, and permits the operator to readily detect variations in the resistance offered by the resistance spring, or springs during the operation of the valve mechanism, without the necessity of using heavier resistance springs, to enable the variations to be felt.

The actuator just described is shown diagrammatically in Fig. 1, installed in connection with brake mechanism for an automotive vehicle, propelled by an internal combustion engine. In this figure, 60, represents the engine for driving the vehicle, provided with an intake manifold, 61, carburetor, 62, and the usual throttle valve, 63, the suction pipe, 32, from the actuator being connected to the intake manifold, and said pipe may be, if desired, provided with a check valve, indicated at 64. The piston rod, 5, is shown connected by a link, 74, with the brake mechanism of the vehicle, which may be of any desired character, and applied to any number of wheels of the vehicle, but is here represented diagrammatically by a brake drum, 70, brake band, 71, brake lever, 72, and retracting spring, 73. 80 represents the operator operated part, in this instance a pivoted foot lever, and connected by a link, 82, with the valve actuating sleeve, 20. We also prefer to connect the operator operated part with the piston of the actuator, and the part operated thereby by means providing a certain amount of lost motion sufficient to insure the operation of the valve mechanism. This may be accomplished in a number of ways. In the present instance, we have shown the collar, 22, on the end of the sleeve, 20, interposed between the end of the cap, 9, and screws, 35. When the lost motion is taken up by bringing the collar, 22, into engagement with the screws, 35, any further pressure on the foot lever will be transmitted to the piston and to the brake mechanism, connected therewith, in addition to the power of the actuator, if the latter is operating, and to enable the brakes to be applied by the physical force of the operator alone in case of failure of power. It will, however, be noted that the spring 21 and the springs 25 serve as tension elements in the connection between the operator operated part and the brake mechanism which is connected directly to the ear 10.

When the parts are in normal position, as shown in Fig. 2, for example, and the engine is running, the suction of the manifold will exhaust the air from the suction pipe, 32, the valve sleeve, 20, and the suction chamber, 13a, on the forward face of the suction valve. The rear face of the suction valve is exposed to atmospheric pressure by reason of the fact that the air inlet valve, 16, is normally open. It will also be seen that the cylinder forward of the piston is filled with air at atmospheric pressure, being in communication with the valve chamber, 13, through the port 34, and with the atmosphere, by reason of the open air inlet valve, 16. As the rear face of the piston is always subjected to atmospheric pressure, the pressures on the opposite faces of the piston are equalized, and the piston is submerged in the higher pressure fluid when in retracted position.

To apply the brakes the operator moves the foot lever, 80, forward in the direction of the arrows, Figs. 1 and 2, which will effect the movement of the valve actuating sleeve in the same direction, permitting the air inlet valve, 16, to close, and afterwards bringing the collar, 20a, into contact with the suction valve and opening the suction valve. It is obvious that the only resistance to be overcome up to this point is the resistance of the retracting spring, 21, and the slight excess of pressure of the springs, 25, above the atmospheric pressure, on the rear face of the valve, 14. The resistance springs, 25, therefore, do not resist the opening movement of the valve, 14, to any great extent. As soon as the valve, 14, opens, however, the cylinder forward of the piston is placed in communication with the suction chamber, 13a, and with the suction pipe, 32, and the air within the cylinder forward of the piston and in the suction chamber, 13, is exhausted, permitting the atmospheric pressure on the rear face of the piston to move the piston forward. At the same time a reduction of the differential of pressures on opposite sides of the suction valve, 14, begins to take place, and as the pressure on the rear face of the valve decreases, a corresponding amount of the pressure of the resistance springs, 25, is transferred to the foot of the operator through the valve actuating sleeve and the foot lever, requiring him to exert more and more strength or pressure, to keep the valve, 14, unseated, as the fluid pressures on opposite sides of said valve approach equalization. The greater the force exerted upon the piston, the greater the force required of the operator to keep the valve, 14, open. This enables the operator to determine by sense of feeling the extent to which the brakes are being applied. As soon as the brakes have been applied to the desired extent, the forward movement of the operator's foot ceases, the piston will overtake the valve sleeve which is movable with and also with respect to the piston, permitting the air inlet valve, 14, to close, without opening the suction valve, 16, and thus holding the brakes applied, but as soon as the valves, 14 close, the pressure of the resistance springs will be transferred from the operator's foot to the valve seat, or stop, 15, of the valve chamber in the piston, and the operator's foot is thus relieved from the necessity of maintaining any pressure on the foot lever beyond that sufficient to overcome the retracting spring, 21, thus relieving the operator of fatigue and effort in prolonged or continued braking. When the operator wishes to effect a further or greater pressure on the braking surfaces, it will be necessary for him to exert a greater physical effort to compress the resistance spring, or springs, 25, and again effect the opening of the suction valve, 14, and the pressure of the resistance springs, 25, which he must overcome will become maximum when the fluid pressures on opposite sides of the valve, 14, are entirely equalized.

To release the brakes, it is only necessary for the operator to remove his foot from or release his pressure on the brake pedal, permitting the retracting spring, 21, to move the valve actuating sleeve rearwardly with respect to the piston, and open the air inlet valve, 16. The suction valve, 14, having been previously closed, atmospheric air rushes into the cylinder forward of the piston, equalizing pressures on opposite faces of the piston, and permitting the retracting springs of the brake mechanism and the load thereof to return the piston and brake mechanism to the off or retracted position. It will be noted that according to our invention all the physical force of the operator, which acts to compress either the retracting spring or the resistance springs, is applied in a direction of the movement of its effective stroke to apply the brakes, hence the reaction of both spring mechanisms tends to move the piston forward, and there is no loss of the physical force of the operator, and the full power of the piston is also applied to the brakes instead of having any portion of it diverted to react upon the foot of the operator, while at the same time the operator is informed by the increase in the force required of him to keep the suction valve, 14, open, or to open it when the brakes are partly applied, to apply greater pressure to the brakes, as to the degree of braking force which he is exerting. This is desirable in the use of power actuators in which the power required to operate the valve mechanism is preferably made comparatively light, and the operator cannot ordinarily determine by the sense of feeling, the degree to which the brakes are applied and must judge the same by the conduct of the vehicle itself. By our invention he is enabled to determine the extent of application of the brakes by the sense of feeling in the same manner as in the operation of the ordinary hand or foot operated brakes, while in holding the brakes applied he is relieved entirely of this increased resistance by the seating of the valve, 14.

It will also be understood that after the brakes are fully applied to the extent of the power of the actuator, the operator may, by further depressing the foot lever so as to take up the lost motion between the valve actuating sleeve, 20, and the piston, apply his physical force to the brake mechanism in addition to that of the actuator, and that if the suction should fail for any reason, the operator may take up this lost motion, in effecting the opening of the suction valve, which will provide for the venting of the cylinder, and may apply the brakes by physical force alone, and in either case the physical force of the operator in compressing either the retracting spring, 21, or resistance springs, 25, will react upon the piston in a direction to effect its forward movement to apply the brakes, so that his full force will be applied to the brakes and none of it is lost in the compression of the springs.

By employing our invention a cylinder of smaller size and less weight may be employed to do the same work with less cost of manufacture and more convenience in installation, and correspondingly smaller quantities of air will be withdrawn into the intake manifold for each application of the brakes. In our application for Letters Patent of the United States, No. 94,912 hereinbefore referred to, we have shown a specific embodiment of the invention applied to an actuator in which the piston is submerged in vacuum when in retracted position, and have made therein generic claims together with specific claims to the said specific embodiment, and these subjects matter will, therefore, not be claimed herein.

In Figs. 3 and 4, we have shown our invention applied to valve mechanism exterior to the cylinder and located in the linkage between the operator operated part and the brake mechanism. In these figures the corresponding parts to those in Figs. 1 and 2 are given the same reference numerals with the addition of 100, to avoid unnecessary duplication of the description. In this instance the valve mechanism is contained within a separate valve casing, 112, in which the valve chambers, 113 and 113$^a$, the suction valve, 114, and the air inlet, 116, the valve actuating sleeve, 120, and the several retracting and resistance springs, 119, 121 and 125, are all constructed and arranged exactly as shown in Fig. 2 and previously described. The passage, 134, of the valve casing, which communicates with the chamber, 113, is connected in this instance with the cylinder, 101, of the actuator forward of the piston, 103, thereof, by a flexible tubular connection, 134$^a$, the actuator being controlled entirely by the exterior valve mechanism. It will be understood that the pipe, 134$^a$, might be connected by suitable branches with a plurality of actuator cylinders and control all of them simultaneously, if desired. The chamber, 113$^a$, communicates with the source of suction, through the hollow valve actuating sleeve, 120, and suction pipe, 132, and air is admitted to the valve casing through an aperture, 109$^a$, in a cap, 109, on one end of the valve casing, and passes through a portion of the sleeve, 120, in rear of the plug, or partition, 129, and through a suitable aperture to the air inlet valve, which is normally held open. The valve actuating sleeve, 120, is connected by link, 182, to the foot lever, 180, and the valve casing is connected by a link rod, 174ª, with the brake mechanism, actuated by the piston of the actuator, in this instance being connected to an arm, 175ª, on the rock shaft 176. The valve mechanism is, therefore, connected in the linkage between the foot lever and the brake mechanism operated by the actuator, and the operator may apply his physical force directly to the brake mechanism by taking up the lost motion between the valve actuating sleeve, 120, and the valve casing, for which purpose the valve sleeve is provided with the collar, 122, for engaging studs, 135, on the cap, 109, of the valve casing. The valve casing is also connected with and moves with the piston by reason of the connection of both the piston and the valve casing with the rock shaft, 176, by the link rods, 174, 174ª, and arms, 175, 175ª. The operation of the valve mechanism will be precisely as previously described.

It will be obvious that by means of suitable pipe connections our valve mechanism herein shown and described may be connected with a plurality of actuator cylinders so as to control the pistons of all of them simultaneously, and this may be accomplished, for example, by connecting the corresponding portions of the cylinders with each other, or by connecting the corresponding portions of the cylinders directly with the valve chamber, as may be most convenient or desirable.

Thus in Fig. 2, we have shown, for example, the cylinder (provided with branch pipe connections, broken away) indicated at 34ª, 34ᵇ, although any desired number of such branch pipes may be employed, each leading to the corresponding portion of another actuator cylinder, which will be valveless, the actuator comprising merely a cylinder and piston, as in Fig. 3, and we have shown said branch pipes provided with cut off valves, 34ᶜ, 34ᵈ, when not used, or the branch pipes may be omitted and the holes therefor suitably plugged. In Fig. 3 we have also shown the pipe, 134ª, provided with a branch pipe, 134ᵇ, for connecting it with the forward end of another similar actuator cylinder, and it will be obvious that any number of branch pipes and auxiliary actuators may be connected with the valve mechanism. The pipe, 134ᵇ, is shown provided with a cut off valve, 134ᶜ, for completeness, but the branch pipes will obviously be connected in any usual or preferred way, in accordance with the number of actuators which are to be employed.

It will also be obvious that the size of the low pressure valve or its exposed areas will depend upon the maximum differential of the fluid pressures used, and therefore when super-atmospheric pressures are employed, a low pressure proportionately smaller valve may be employed to avoid building up reactionary or pressures beyond the point of comfort.

What we claim and desire to secure by Letters Patent is:—

1. In a power actuator, the combination of a cylinder, a piston in said cylinder provided with means for connecting it with a part to be operated, means for connecting the cylinder on one side of the piston alternately with sources of higher and lower fluid pressures, including a lower pressure valve, having opposite faces of substantially equal areas, one of which is normally exposed to the higher pressure fluid and the other to the lower pressure fluid, when in the closed position, yielding resistance means for holding said lower pressure valve closed against the higher fluid pressure, interposed between said valve and a part connected with the part to be operated, an operator operated part connected with the lower pressure valve for moving it in a direction to open it, said resistance means having sufficient force to offer material resistance to the movement of the operator operated part in a direction to open the lower pressure valve when the fluid pressures on opposite faces thereof are equalized, and said resistance means being nearly counterbalanced by the maximum differential of fluid pressures when said valve is closed, whereby when said lower pressure valve is opened, the pressure of said resistance means therefor will be transferred to the operator through the operator operated part, in proportion to the decrease of the differential of fluid pressures on opposite faces of said valve.

2. In a power actuator, the combination of a cylinder closed at one end and communicating with the atmosphere at the other end, a piston in said cylinder provided with means for connecting it with a part to be operated, means for connecting the portion of the cylinder between the piston and the closed end of the cylider alternately with the atmosphere and with a source of suction, including a suction valve having opposite faces of substantially equal areas, one of which is normally exposed to atmospheric pressure and the other face to suction when in the closed position, yielding resistance means for holding said suction valve closed against atmospheric pressure, interposed between the suction valve and a part connected with the part to be operated, a stop for limiting the closing movement of the valve, an operator operated part connected with the suction valve for moving it in a direction to open it against the pressure of said resistance means, said resistance means having sufficient power to offer material resistance to the movement of the operator operated part in a direction to unseat the suction valve when the fluid pressures on opposite faces of the valve are equalized, and said valve having a sufficient area exposed to atmospheric pressure to nearly counterbalance the pressure of said resistance means, whereby said valve may be opened by slight pressure upon the operator operated part and when opened the pressure of said resistance means will be transferred to the operator through said operator operated part, in proportion to the decrease of the differential of fluid pressures on opposite faces of the valve, and whereby when the valve is closed the pressure of said resistance means will be transferred from the operator operated part to the valve stop regardless of the fluid pressures on the opposite faces of the valve.

3. In a power actuator, the combination of a cylinder closed at one end and communicating with the atmosphere at the other end, a piston in said cylinder provided with means for connecting it with a part to be actuated, means for connecting the portion of the cylinder between the piston and the closed end of the cylinder alternately with the atmosphere and with a source of suction, including a suction valve having opposite faces of substantially equal areas, one of which is exposed to atmospheric pressure and the other face to suction when in the closed position, yielding resistance means for holding said suction valve closed against atmospheric pressure, interposed between the suction valve and a part connected with the part to be operated, the movement of said suction valve in a direction to open it being in the same direction as the stroke of the piston to effect the operation of the part to be operated, an operator operated part connected with said suction valve, said resistance means having sufficient power to offer material resistance to the movement of the operator operated part in a direction to open said valve when the fluid pressures on opposite faces thereof are equalized, and said valve having a sufficient area exposed to atmospheric pressure to nearly counterbalance the pressure of said resistance means, whereby the pressure of said resistance means will be transferred to the operator when the valve is opened, in proportion to the decrease of the differential of fluid pressures on opposite faces of the valve, and whereby the physical power of the operator transmitted to said resistance means will be transmitted thereby to the part to be operated in the direction of the stroke of the piston.

4. In a power actuator, the combination of a cylinder closed at one end and communicating with the atmosphere at the other end, a piston in said cylinder provided with means for connecting it with a part to be operated, controlling valve mechanism including among its members a valve chamber communicating with the portion of the cylinder between its closed end and the piston, and provided with means for connecting it with a source of suction and with the atmosphere, an air inlet valve for controlling said atmospheric connection, a suction valve of considerable area interposed between said valve chamber and the source of suction, having one face exposed to suction and the opposite face exposed to the pressure within the valve chamber and within the closed end of the cylinder when the suction valve is seated, yielding resistance means for holding said suction valve seated, interposed between said valve and a part rigidly connected with the part to be operated, an operator operated part, means for connecting it with said valves, constructed to hold the air inlet valve open when in the released position to submerge the piston in air at atmospheric pressure, said resistance means having sufficient power to offer material resistance to the movement of the operator operated part in a direction to unseat the suction valve, when the fluid pressures on opposite faces of the valve are equalized, said valve having a sufficient area exposed to the interior of the valve chamber to nearly counterbalance the pressure of said resistance means when the air inlet valve is opened and the suction valve is seated, whereby when said suction valve is unseated the pressure of said resistance means will be transferred to the operator in proportion to the decrease of the differential of fluid pressures on opposite faces of said valve, and the pressure of said resistance means will be transferred from the operator to the valve seat when the suction valve is seated, regardless of the differential of fluid pressures on said valve.

5. In a power actuator, the combination of a cylinder closed at one end and communicating with the atmosphere at the other end, a piston in said cylinder provided with means for connecting it with a part to be operated, controlling valve mechanism including among its members a valve chamber communicating with the portion of the cylinder between its closed end and the piston, and provided with means for connecting it with a source of suction and with the atmosphere, an air inlet valve for controlling said atmospheric connection, a suction valve of considerable area interposed between said valve chamber and the source of suction, having one face exposed to suction and the opposite face exposed to the pressure within the valve chamber and within the closed end of the cylinder when the suction valve is seated, yielding resistance means for holding said suction valve seated, interposed between said valve and a part rigidly connected with the part to be operated, an operator operated part, means for connecting it with said valve, constructed to hold the air inlet valve open when in released position, to submerge the piston in air at atmospheric pressure, said resistance means having sufficient power to offer material resistance to the movement of the operator operated part in a direction to unseat the suction valve, when the fluid pressures on opposite faces of the valve are equalized, said valve having a sufficient area exposed to the interior of the valve chamber to nearly counterbalance the pressure of said yielding means when the air inlet valve is opened and the suction valve is seated, the direction of movement of the suction valve to open it against the pressure of said resistance means being the same as the direction of the stroke of the piston effected by the opening of the suction valve, whereby the pressure applied to the suction valve to open it will be transmitted to the part to be operated in the direction of the working stroke of the piston, and when said valve is open the force of said yielding means will be transmitted to the operator through the operator operated part, in proportion to the decrease in the differential of fluid pressures on opposite faces of said valve.

6. In a power actuator, the combination of a cylinder closed at one end and communicating with the atmosphere at the other end, a piston in said cylinder provided with means for connecting it to a part to be operated, controlling valve mechanism for the actuator comprising a valve chamber carried by the piston and communicating with the portion of the cylinder between the piston and the closed end of the cylinder, said valve chamber being provided with means for connecting it with the atmosphere and with a source of suction, and having oppositely disposed inlet and suction valve seats, oppositely disposed inlet and suction valves for engaging said respective seats, yielding seating means for the air inlet valve, said suction valve being interposed between the source of suction and the valve chamber, and having a face of considerable area exposed to the fluid pressure within the valve chamber and the portion of the cylinder connected therewith, and having its opposite face exposed to suction, yielding resistance means for seating the suction valve, interposed between said valve and a part connected rigidly with the piston, said resistance means having sufficient power to offer material resistance to the movement of the suction valve in a direction away from its seat when the fluid pressures on opposite faces of said valve are equalized, and being nearly counterbalanced when the face of said valve adjacent to the valve chamber is exposed to atmospheric pressure, a valve actuating part extending through said valves and the piston and movable with and with respect to the piston, said part being provided with means for engaging one of said valves to open it when moved in either direction with respect to the piston, an operator operated part connected with said valve actuating part, retracting means for said valve actuating part, and means for arresting said valve actuating part in position to hold the air inlet valve open when in the released position, whereby when the operator operated part is moved in the direction to open the suction valve after permitting said air inlet valve to close, the force of said resistance means will be transferred to the operator, in proportion to the decrease in the differential of fluid pressures on opposite faces of said suction valve.

7. In a power actuator, the combination of a cylinder closed at one end and communicating with the atmosphere at the other end, a piston in said cylinder provided with means for connecting it to a part to be operated, controlling valve mechanism for the actuator comprising a valve chamber carried by the piston and communicating with the portion of the cylinder between the piston and the closed end of the cylinder, said valve chamber being provided with means for connecting it with the atmosphere and with a source of suction, and having oppositely disposed inlet and suction valve seats, oppositely disposed inlet and suction valves for engaging said respective seats, yielding seating means for the air inlet valve, said suction valve being interposed between the source of suction and the valve chamber, and having a face of considerable area exposed to the fluid pressure within the valve chamber and the portion of the cylinder connected therewith, and having its opposite face exposed to suction, resistance means for seating the suction valve, interposed between said valve and a part connected rigidly with the piston, said resistance means having sufficient power to offer material resistance to the movement of the suction valve in a direction away from its seat when the fluid pressures on opposite faces of said valve are equalized, and being nearly counterbalanced when the face of said valve adjacent to the valve chamber is exposed to atmospheric pressure, a valve actuating part extending through said valves and the piston and movable with and with respect to the piston, said part being provided with means for engaging one of said valves to open it when moved in either direction with respect to the piston and to permit one of said valves to close whenever the other is open, while permitting the simultaneous closing of both valves, an operator operated part connected with said valve actuating part, retracting means for said valve actuating part, and means for arresting said valve actuating part in position to hold the air inlet valve open when in the released position, whereby when the operator operated part is moved in the direction to open the suction valve after permitting said air inlet valve to close, the force of said resistance means will be transferred to the operator, in proportion to the decrease in the differential of fluid pressures on opposite faces of said valve, and the seating of said suction valve while the inlet valve is seated will enable the operator to hold any differentials of pressures on opposite faces of the piston without sustaining the pressure of said resistance mean.

8. In a power actuator, the combination of a cylinder closed at one end and communicating with the atmosphere at the other end, a piston in said cylinder provided with means for connecting it to a part to be operated, controlling valve mechanism for the actuator comprising a valve chamber carried by the piston and communicating with the portion of the cylinder between the piston and the closed end of the cylinder, said valve chamber being provided with means for connecting it with the atmosphere and with a source of suction, and having oppositely disposed inlet and suction valve seats, oppositely disposed inlet and suction valves for engaging said respective seats, yielding seating means for the air inlet valve, said suction valve being interposed between the source of suction and the valve chamber, and having a face of considerable area exposed to the fluid pressure within the valve chamber and the portion of the cylinder connected therewith, and having its opposite face exposed to suction, yielding resistance means for seating the suction valve, interposed between said valve and a part connected rigidly with the piston, said resistance means having sufficient power to offer material resistance to the movement of the suction valve in a direction away from its seat when the fluid pressures on opposite faces of said valve are equalized, and being nearly counterbalanced when the face of said valve adjacent to the valve chamber is exposed to atmospheric pressure, a valve actuating part extending through said valves and the piston and movable with and with respect to the piston, said part being provided with means for engaging one of said valves to open it when moved in either direction with respect to the piston, an operator operated part connected with said valve actuating part, retracting means for said valve actuating part, and means for arresting the valve actuating part in position to hold the air inlet valve open when in the released position, the direction of movement of the valve actuating part to open said suction valve being the same as the direction of the piston stroke effected thereby, whereby the force required to overcome the said resistance means will be transmitted to the piston in the direction of its stroke.

9. In a power actuator, the combination of a cylinder closed at one end and communicating with the atmosphere at the other end, a piston in said cylinder provided with means for connecting it with a part to be operated, means for connecting the portion of the cylinder between its closed end and the piston with the atmosphere and with a source of suction, including a suction valve having one face normally exposed to atmospheric pressure and the other face to suction when the piston is submerged in air at atmospheric pressure, and provided with yielding resistance means for seating said valve, interposed between the valve and a part operatively connected with the part to be operated, an operator operated part connected with said suction valve for opening it, said resistance means having sufficient power to materially resist the movement of the operator operated part in a direction to open said valve when the fluid pressures on opposite faces of said valve are equalized, and being nearly counterbalanced by the atmospheric pressure on the face of said valve exposed thereto, means including a provision for lost motion, for effecting a connection between the operator operated part and the part to be operated, and means for disconnecting the said portion of the cylinder from the atmosphere when the suction valve is opened, whereby the movement of the operator operated part to unseat the suction valve will transfer to the operator the pressure of said resistance means, in proportion to the decrease in the differential of fluid pressures on opposite faces of said valve, and by taking up said lost motion the operator may add his physical force to the part to be operated in addition to the power of the actuator, or in case of failure of power.

10. In a power actuator, the combination of a cylinder closed at one end and communicating with higher pressure fluid at the other end, a piston in said cylinder provided with means for connecting it with a part to be operated, means for connecting the portion of the cylinder between its closed end and the piston with the source of higher pressure fluid and with a source of suction, including a normally closed suction valve having one face normally exposed to high pressure and the other face to suction, and provided with yielding resistance means for seating said valve, interposed between the valve and a part operatively connected with the part to be operated, an operator operated part connected with said suction valve for opening it, said resistance means having sufficient power to materially resist the movement of the operator operated part in a direction to open said valve when the fluid pressures on opposite faces of said valve are equalized, and being nearly counterbalanced by a source of higher pressure fluid pressure on the face of said valve exposed thereto, means including a provision for lost motion, for effecting a connection between the operator operated part and the part to be operated, and means for disconnecting the said portion of the cylinder from the high pressure fluid when the suction valve is opened, the direction of movement of the suction valve to open it being the same as the direction of the stroke of the piston effected by the opening of said valve.

11. In a power actuator, the combination of a cylinder closed at one end and communicating with the atmosphere at its opposite end, a piston in said cylinder provided with means for connecting it with a part to be operated, controlling valve mechanism for the actuator comprising an air inlet valve for controlling the connection between the portion of the cylinder forward of the piston and the atmosphere, a suction valve of greater area than the inlet valve for controlling the connection between the said portion of the cylinder and the source of suction, said suction valve having a face exposed at all times to suction and its opposite face exposed to atmospheric pressure when the valve is closed and said valve mechanism is in the released position, yielding resistance means interposed between the suction valve and a part connected with the part to be operated and tending to seat said valve, said resistance means having sufficient power to materially resist the movement of the suction valve in a direction to open it when the fluid pressures on opposite faces are equalized, and being nearly counterbalanced by the fluid pressure on the opposite face of the valve when exposed to atmospheric pressure, valve actuating means constructed to open one of said valves when moved in either direction and to permit one of said valves to seat whenever the other of said valves is open, an operator operated part connected with the valve actuating part, retracting means for the valve actuating part operative in a direction to open the air inlet valve, and means for arresting the valve actuating part in position to hold the air inlet valve open when the valve mechanism is in the released position, whereby the movement of the operator operated part in a direction to open the suction valve after permitting the closing of the air inlet valve will transfer to the operator the pressure of said resistance means, in proportion to the decrease in the differential of fluid pressure on opposite faces of the suction valve.

12. In brake mechanism for an automotive vehicle, the combination of an actuator comprising a cylinder closed at one end and communicating with a source of higher pressure fluid at the other end, a piston in said cylinder operatively connected with brake mechanism for the vehicle, and means for connecting the portion of the cylinder between the piston and the closed end of the cylinder alternately with the higher pressure fluid and with the source of suction, including a suction valve having opposite faces of substantially equal areas, one of which is normally exposed to higher pressure and the other to suction when the valve is closed, yielding resistance means for holding said suction valve closed interposed between the suction valve and a part connected with the brake mechanism, an operator operated part connected with the suction valve for moving it in a direction to open it, said resistance means having sufficient force to offer material resistance to the movement of the operator operated part in a direction to open the suction valve, and being nearly counter-balanced by the higher pressure on the suction valve when the later is closed, whereby said resistance means will offer very slight resistance to the opening of the suction valve, and when said valve is opened the pressure of said resistance means will be transferred to the operator operated part in proportion to the decrease of differential of fluid pressures.

13. In brake mechanism for an automotive vehicle, the combination of an actuator comprising a cylinder closed at one end and communicating with the atmosphere at the other end, a piston in said cylinder operatively connected with brake mechanism for the vehicle, and means for connecting the portion of the cylinder between the piston and the closed end of the cylinder alternately with the atmosphere and with the source of suction, including a suction valve having opposite faces of substantially equal areas, one of which is normally exposed to atmospheric pressure and the other to suction when the valve is closed, yielding resistance means for holding said suction valve closed against atmospheric pressure interposed between the suction valve and a part connected with the brake mechanism, an operator operated part connected with the suction valve for moving it in a direction to open it, said resistance means having sufficient force to offer material resistance to the movement of the operator operated part in a direction to open the suction valve, and being nearly counter-balanced by the atmospheric pressure on the suction valve when the latter is closed, said suction valve being provided with a stop for limiting its movement under the action of said resistance means, whereby when said valve is closed the pressure of said yielding means will be transferred from the operator operated part to the valve stop regardless of the fluid pressures on the opposite faces of the valve.

14. In brake mechanism for an automotive vehicle, the combination of an actuator comprising a cylinder closed at one end and communicating with the atmosphere at the other end, a piston in said cylinder operatively connected with brake mechanism for the vehicle, and means for connecting the portion of the cylinder between the piston and the closed end of the cylinder alternately with the atmosphere and with the source of suction, including a suction valve having opposite faces of substantially equal areas, one of which is normally exposed to atmospheric pressure and the other to suction when the valve is closed, yielding resistance means for holding said suction valve closed against atmospheric pressure interposed between the suction valve and a part connected with the brake mechanism, an operator operated part connected with the suction valve for moving it in a direction to open it, said resistance means having sufficient force to offer material resistance to the movement of the operator operated part in a direction to open the suction valve, and being nearly counterbalanced by the atmospheric pressure on the suction valve when the latter is closed, said suction valve being provided with a stop for limiting its movement under the action of said resistance means, and the direction of movement of the suction valve, to open it, being the same as the stroke of the piston to apply the brakes, whereby the physical power of the operator to open said valve and hold it open against said resistance means will be transmitted to the brake mechanism, the pressure of said resistance means will be transmitted to the operator operated part when said valve is opened, in proportion to the decrease in the differential of fluid pressures on opposite faces of the valve, and when said valve is closed the pressure of said resistance means will be exerted against said stop.

15. In brake mechanism for an automotive vehicle, provided with an internal combustion engine having a suction passage, the combination of an actuator closed at one end and communicating with the atmosphere at the other end, a piston in said cylinder connected with brake mechanism of the vehicle, means for connecting the portion of the cylinder between the piston and the closed end of the cylinder alternately with the atmosphere and with said suction passage, including a suction valve having opposite faces of substantially equal areas, one of which is normally exposed to atmospheric pressure and the other suction, when the valve is closed, yielding resistance means for holding said suction valve closed against atmospheric pressure interposed between the suction valve and a part connected with the brake mechanism, an operator operated part connected with the suction valve for opening it, said resistance means having sufficient force to offer material resistance to the movement of the operator operated part when the suction valve is opened and being nearly counterbalanced by the atmospheric pressure and suction valve when closed, whereby when said suction valve is opened the pressure of said resistance means will be transferred to the operator in proportion to the decrease of the differential of fluid pressures on opposite faces of said valve.

16. In a power actuator, the combination of a cylinder and a piston therein provided with means for connecting it with a part to be operated, means for connecting the cylinder on one side of the piston alternately with sources of higher and lower fluid pressures, including a lower pressure valve having opposite faces of substantially equal areas, one of which is normally exposed to the higher fluid pressure and the other to the lower fluid pressure when the valve is in closed position, yielding resistance means tending to hold said valve closed against the higher fluid pressure, interposed between said valve and a part connected with the part to be operated, a stop for engaging said valve when in closed position, a higher pressure inlet valve of smaller diameter than the lower pressure valve, having one of its opposite faces at all times exposed to the higher fluid pressure and the other to the lower fluid pressure when said valve is closed and the lower pressure valve is open, yielding means for closing said valve, valve actuating means constructed to open one valve after permitting the other to close, when moved in either direction, an operator operated part connected with said valve actuating means, said resistance means having sufficient power to offer material resistance to the movement of the operator operated part in a direction to open the lower pressure valve and said resistance means being nearly counterbalanced by the maximum differential of fluid pressures on said valve when it is closed, and a light retracting spring for said operator operated part normally tending to hold the higher pressure valve in open position, whereby the lower pressure valve may be opened by slight pressure on the operator operated part, and when opened the pressure of said resistance means will be transferred to the operator operated part in proportion to the decrease in the differential of fluid pressures on said valve, and the operator is relieved of the load of the resistance means when said valve is closed, and will only have to support the resistance of said retracting spring, and whereby the relatively smaller lighter pressure valve permits it to be opened against the maximum differential of fluid pressure to which it is subjected when closed by a light retracting spring, which will not unnecessarily add to the effort required of the operator to overcome the same, and slight variations in the amounts of pressure of the resistance means transferred to the operator operated part may be more readily detected by the operator.

17. In a power actuator, the combination of a cylinder closed at one end and communicating with the atmosphere at the other end, a piston in said cylinder provided with means for connecting it with a part to be operated, controlling valve mechanism for the actuator, for connecting the cylinder with a source of suction and with the atmosphere comprising a suction valve and an air inlet valve, said suction valve having opposite faces of substantially equal and relatively large area, one of which is exposed to atmospheric pressure when the inlet valve is open, and the other of which is subjected to suction, yielding resistance means interposed between the suction valve and a part connected with the part to be operated, of sufficient force to close said valve against the pressure of the atmosphere, said air inlet valve having opposite faces of equal but relatively smaller area, one subjected to atmospheric pressure at all times, and the other subjected to suction when the inlet valve is closed, yielding means tending to close the inlet valve, stops for arresting said valves in their closed positions, an operator operated part connected with said valves to open one and permit the other to close when moved in either direction, and constructed to permit both valves to close simultaneously, said resistance means having sufficient power to offer material resistance to the movement of the operator operated part in a direction to open the suction valve, when the fluid pressures on opposite faces of said valve are equalized, and said resistance means being nearly counterbalanced by the atmospheric pressure on said valve when it is closed and the inlet valve is open, a light retracting spring normally tending to seat said inlet valve, the relatively smaller higher pressure valve permitting it to be opened against the maximum differential of fluid pressures to which it is subjected, which will not unnecessarily add to the effort required of the operator to overcome the same and whereby slight variations in the pressure of the resistance means transmitted to the operator operated part may be more readily detected by the operator.

18. In a power actuator, the combination with a cylinder and a piston therein, an operator operated part and a part to be operated, of valve mechanism for controlling differentials of fluid pressure to said cylinder for producing a power stroke of the piston, said valve mechanism including suction and high pressure valves, means normally acting to seat the suction valve, means normally acting to open the high pressure valve, and a lost motion connection between the operator operated part and the part to be operated serving to control the valves and in which both means act as tension elements.

19. In a power actuator, the combination with a cylinder and a piston therein, an operator operated part and a part to be operated, of valve mechanism for controlling differentials of fluid pressure to said cylinder for producing a power stroke of the piston, said valve mechanism including suction and high pressure valves, means normally acting to seat the suction valve, and a lost motion connection between the operator operated part and the part to be operated serving to control the valve and in which one of said means acts as a tension element and through the operator operated part as an indicator of the differentials of pressure acting on the piston.

20. Valve mechanism for cylinder and piston power actuators operating on differentials of fluid pressure, comprising a hollow valve casing having ports for the passage of high and low pressure fluid, a high pressure valve, a low pressure valve, said valves arranged to control said ports, means acting to normally hold the low pressure valve seated, means normally acting to hold the high pressure valve open, said first means operating against the high and low pressures, and means to successively close the high pressure valve and open the low pressure valve.

21. Valve mechanism for cylinder and piston power actuators operating on differentials of fluid pressure, comprising a hollow valve casing having ports for the passage of high and low pressure fluid, a high pressure valve, a low pressure valve of larger dimension than the higher pressure valve, said valves arranged to control said ports, means acting to normally hold the low pressure valve seated, means normally acting to hold the high pressure valve open, said first means operating against the high and low pressures, and means to successively close the high pressure valve and open the low pressure valve.

22. Valve mechanism for cylinder and piston power actuators operating on differentials of fluid pressure, comprising a hollow valve casing having ports for the passage of high and low pressure fluid, a high pressure valve, a low pressure valve of larger dimension than the higher pressure valve, said valves arranged to control said ports, means acting to normally hold the low pressure valve seated, means normally acting to hold the high pressure valve open, said first means operating to slightly overbalance the high and low pressures acting on opposite faces of the low pressure valve, and an operator operated part for successively closing the high pressure valve and opening the low pressure valve.

23. In a power actuator, the combination with a cylinder open at one end and closed at the other, and a part to be operated connected to the piston, of valve mechanism for controlling differentials of pressure to said cylinder for producing a power stroke of said piston, said valve mechanism including suction and high pressure valves, means acting to seat the suction valve, means acting to open the high pressure valve, and means to successively close the high pressure valve and open the suction valve including a lost motion connection to the part to be operated in which both of the aforesaid means act as tension elements.

24. In a power actuator, the combination with a cylinder and a piston therein, an operator operated part and a part to be operated, of valve mechanism for controlling differentials of fluid pressure to said cylinder for producing a power stroke of the piston, said valve mechanism including suction and high pressure valves, means normally acting to seat the suction valve, a valve actuating member connected to the operator operated part, means normally acting to bias said valve actuating member in one direction, and a lost motion connection between the valve actuating member and the part to be actuated in which both of said means serve as tension elements.

In testimony whereof we affix our signatures.

CALEB S. BRAGG.
VICTOR W. KLIESRATH.